United States Patent
Matthews

(10) Patent No.: US 10,136,634 B2
(45) Date of Patent: Nov. 27, 2018

(54) LADDER STAND MOBILITY

(71) Applicant: Thomas Leon Matthews, Clarksville, GA (US)

(72) Inventor: Thomas Leon Matthews, Clarksville, GA (US)

( * ) Notice: Subject to any disclaimer, the term of this patent is extended or adjusted under 35 U.S.C. 154(b) by 0 days.

(21) Appl. No.: 15/732,278

(22) Filed: Oct. 18, 2017

(65) Prior Publication Data
US 2018/0139951 A1   May 24, 2018

Related U.S. Application Data

(60) Provisional application No. 62/497,582, filed on Nov. 22, 2016.

(51) Int. Cl.
*E06C 5/00* (2006.01)
*A01M 31/02* (2006.01)

(52) U.S. Cl.
CPC .................. *A01M 31/02* (2013.01)

(58) Field of Classification Search
CPC ..... E06C 5/00; E06C 5/02; E06C 7/32; E06C 7/00
See application file for complete search history.

(56) References Cited

U.S. PATENT DOCUMENTS

| | | | | |
|---|---|---|---|---|
| 1,606,198 A * | 11/1926 | Werk | ................. | E06C 7/48 182/107 |
| 5,833,028 A * | 11/1998 | Ramsey | ................. | E06C 7/48 182/129 |
| 6,276,490 B1 * | 8/2001 | Swanick, Jr. | ............ | E06C 1/397 182/107 |
| 6,592,134 B2 * | 7/2003 | Abraham | ................. | B62B 5/0083 16/29 |
| 7,168,729 B2 * | 1/2007 | Wagner | ................. | A01M 31/006 280/30 |
| 7,350,621 B2 * | 4/2008 | Abraham | ................. | B62B 5/0083 16/29 |
| 9,751,546 B2 * | 9/2017 | Spruth | ................. | B62B 1/262 |

* cited by examiner

*Primary Examiner* — James A Shriver, II
*Assistant Examiner* — James J Triggs
(74) *Attorney, Agent, or Firm* — Timothy S. Stevens; Karen L. Kimble

(57) ABSTRACT

A kit of parts including a wheel, a bracket, an axel and an axel retainer. The axel having a central diameter, a larger first end and a second end portion adapted to receive an axel retainer. The bracket having a U-shape so that the bracket comprises a pair of spaced apart legs each of which legs comprise an axel aperture therein. The wheel having a hub comprising an axel bore there through. The central diameter of the axel is smaller than the axel aperture in each leg of the U-shaped bracket and smaller than the axel bore of the hub of the wheel. The axel has a first end diameter larger than the axel aperture in each leg of the U-shaped bracket so that the U-shaped bracket can be slipped over the rail of a ladder stand section near one end of the ladder stand section so that the second end of the axel can be inserted through the axel apertures of the U-shaped bracket so that the wheel can be slid onto the axel with the second end of the axel extending from the bracket so that the axel retainer can be attached to the second end portion of the axel to retain the wheel on the axel.

7 Claims, 6 Drawing Sheets

US 10,136,634 B2

LADDER STAND MOBILITY

BACKGROUND OF THE INVENTION

The instant invention relates to hunting ladder tree stands and more specifically to systems for ladder stand mobility. Hunting ladder tree stands are comprised of a number of ladder sections that are joined together at a hunting location. The upper most section is attached to a tree trunk and comprises a seat for the hunter. The sections can be carried to the hunting location one at a time or as a bundle on a ladder dolly such as the GUARDIAN FALL PROTECTION ladder dolly or the LEVELOK ladder dolly. However, conventional ladder dollies are not designed for such use and tend to have wheels that are less than optimum for use over rough ground. Game carts are designed for use by hunters to transport harvested game (such as deer, bear or elk) from a hunting location and game carts can be used to transport ladder stand sections to a hunting location. It would be an advance in the art if it were possible to convert a ladder stand section or a bundle of ladder stand sections into a game cart so that the ladder stand could be transported to and from a hunting location and used as a game cart.

SUMMARY OF THE INVENTION

The instant invention is the discovery of a system to convert a ladder stand section or a bundle of ladder stand sections into a game cart so that a ladder stand can be transported to and from a hunting location and used as a game cart. More specifically, the instant invention is a kit of parts comprising: a wheel, a bracket, an axel and an axel retainer, the axel having a central diameter, a larger first end and a second end portion adapted to receive an axel retainer, the bracket having a U-shape so that the bracket comprises a pair of spaced apart legs each of which legs comprise an axel aperture therein, the wheel having a hub comprising an axel bore there through, the central diameter of the axel being smaller than the axel aperture in each leg of the U-shaped bracket and smaller than the axel bore of the hub of the wheel, the axel having a first end diameter larger than the axel aperture in each leg of the U-shaped bracket so that the U-shaped bracket can be slipped over the rail of a ladder stand section near one end of the ladder stand section so that the second end of the axel can be inserted through the axel apertures of the U-shaped bracket so that the wheel can be slid onto the axel with the second end of the axel extending from the bracket so that the axel retainer can be attached to the second end portion of the axel to retain the wheel on the axel.

In another embodiment the instant invention is a method for transporting a ladder stand section or bundle of ladder stand sections using a pair of the above mentioned kit of parts by slipped the U-shaped brackets over the rails of a ladder stand section so that the axels can be inserted through the axel apertures of the U-shaped brackets so that the wheels can be slid onto the axels with the second ends of the axels extending from the axel bore of the hubs of the wheels and so that the axel retainers can be attached to the second end portion of the axel so that the ladder stand section or bundle of ladder stand sections can be transported on the wheels.

DETAILED DESCRIPTION OF THE INVENTION

Figure 1:
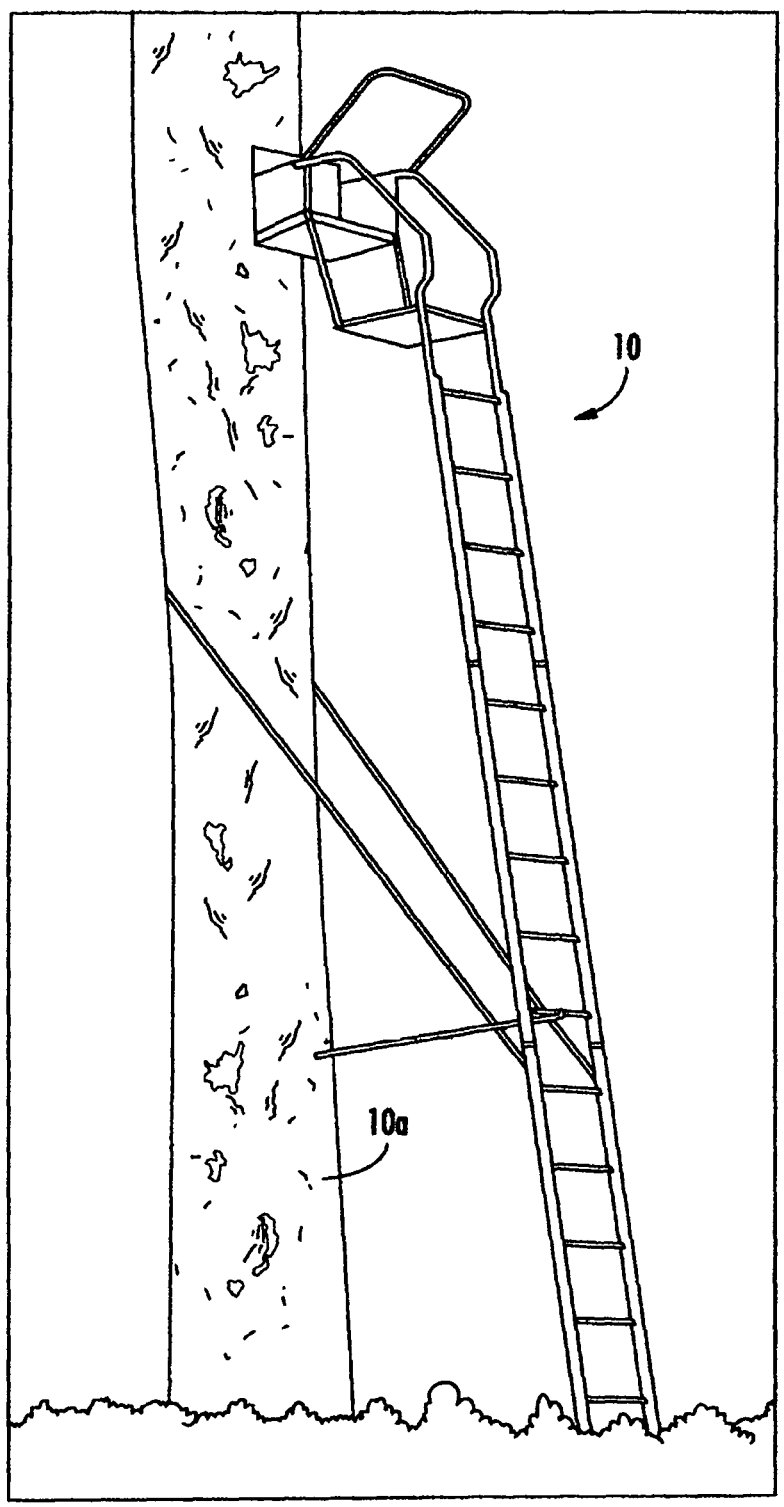
FIG. 1 is a photograph of a conventional hunting ladder tree stand.

Referring now to FIG. 1, therein is shown a drawing of assembled conventional hunting ladder tree stand 10 attached to tree 10a. Stand 10 is assembled from ladder sections, the uppermost of which comprises a seat for the hunter.

Figure 2:
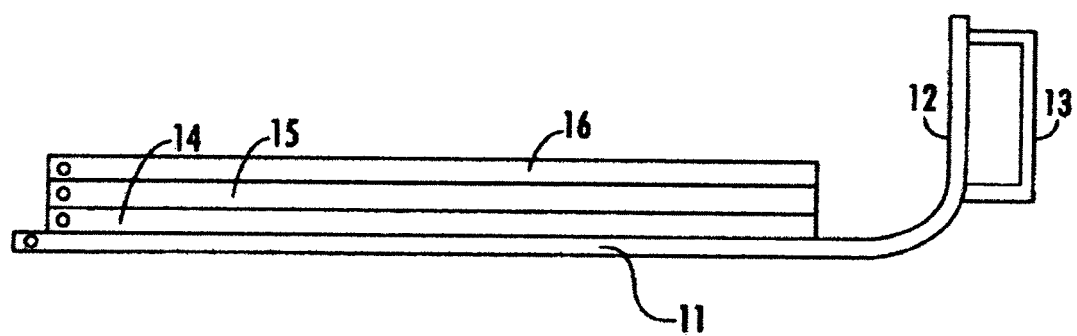
FIG. 2 is a side view depicting sections of a hunting ladder tree stand bundled for transport to a hunting location.

Referring now to FIG. 2, therein is shown a side view depicting sections of a hunting ladder tree stand bundled for transport to a hunting location. Side rails 11, 14, 15 and 16 of the sections of the stand are shown. The lowest section comprises seat 12 and hand rail 13.

Figure 3:
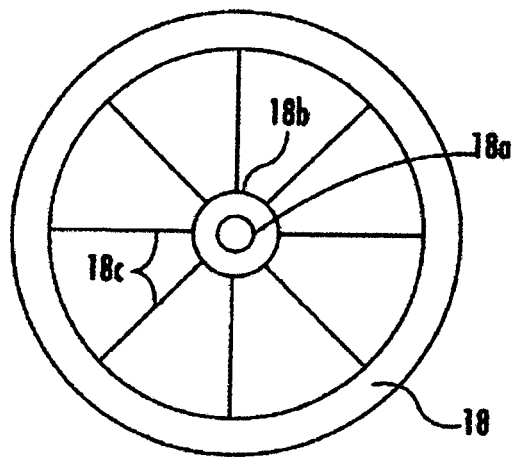
FIGS. 3-5 depict a kit of parts consisting of a wheel, a U-shaped bracket, an axel and a pin clip.
Figure 4:
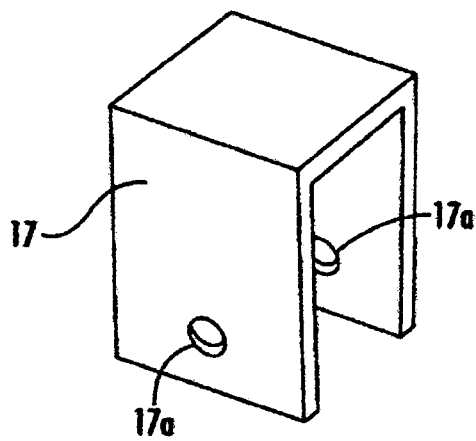
Figure 5:
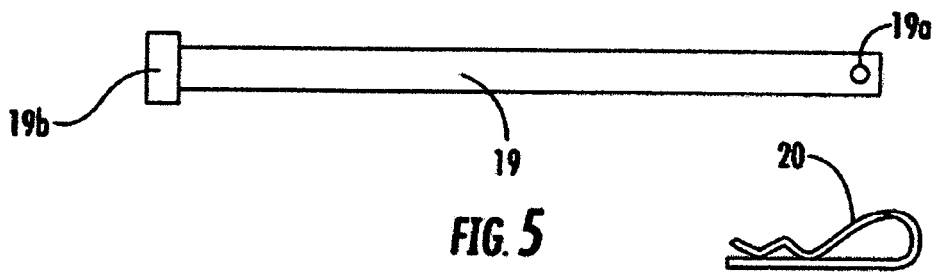

Referring now to FIGS. 3-5, therein is shown a kit of parts consisting of wheel 18, U-shaped bracket 17, axel 19 and pin clip 20. Bracket 17 comprises axel apertures 17a in each leg thereof. Wheel 18 has a hub 18b having axel bore 18a there through. Wheel 18 is shown having spokes 18c. One end of axel 19 has bore 19a therethrough having an axis that is transverse to the longitudinal axis of axel 19. Axel 19 has a central diameter smaller than axel apertures 17a in each leg of bracket 17 and smaller than axel bore 18a in hub 18b. Axel 19 is shown with a head first end portion 19b larger than axel apertures 17a and larger than axel bore 18a so that bracket 17 can be slipped over the rail of a ladder stand section (as shown for example in FIG. 6) near one end of the ladder stand section so that axel 19 can be inserted through axel apertures 17a of bracket 17 (as shown in FIG. 7) so that the wheel 18 can be slid onto axel 19 with the second end of axel 19 extending from bore 18a of hub 18b of wheel 18 and so that pin clip 20 can be inserted through bore 19a to retain wheel 18 on axel 19.

Figure 8:
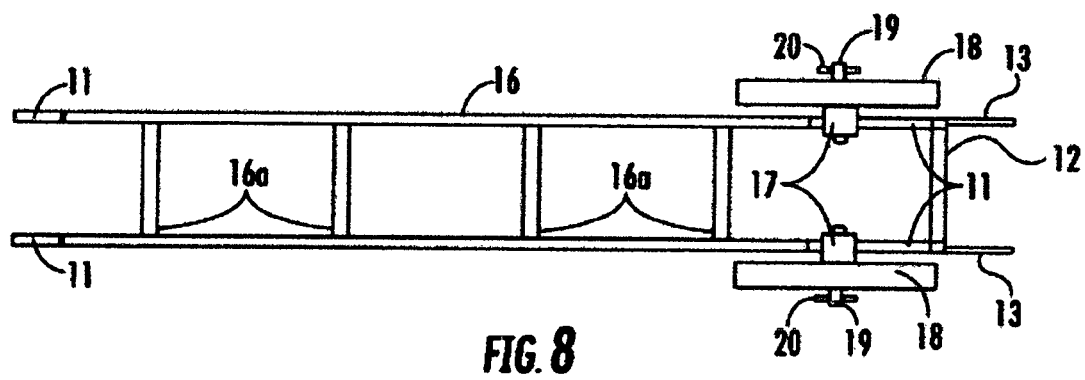
FIG. 8 is a top view of the ladder stand sections of FIG. 2 with a pair of the kit of parts of FIGS. 3-5 attached to the side rails of the bottom ladder stand section.

Referring now to FIG. 8, therein is shown a top view of the ladder stand sections of FIG. 2 with a pair of the kit of parts of FIGS. 3-5 attached to the rails 11 of the bottom ladder stand section. FIG. 8 also shows ladder rungs 16a of the top ladder stand section. It should be understood that it is equivalent in the method of the instant invention to insert axel 19 first through bore 18a in wheel 18, then through apertures 17a in bracket 17 and then to retain wheel 18 on axel 19 with, for example, pin clip 20.

Figure 6:
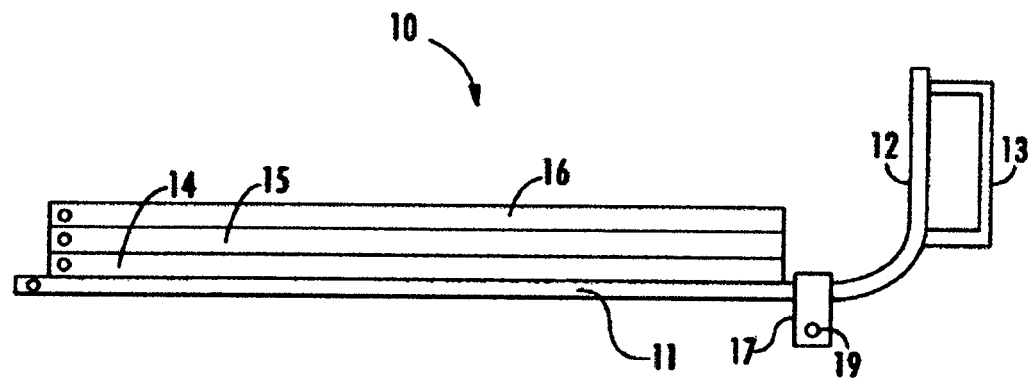
FIG. 6 is a side view of the ladder stand sections of FIG. 2 with the U-shaped bracket of FIG. 3 slipped over the side rail of the bottom ladder stand section.
Figure 7:
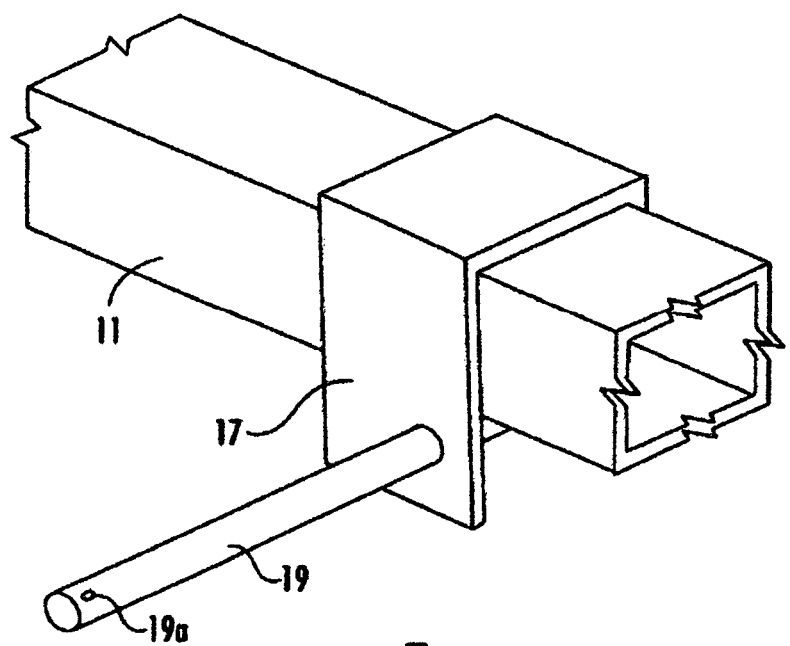
FIG. 7 is a perspective enlarged view of the U-shaped bracket of FIG. 4 also showing the axel of FIG. 5 inserted through the axel apertures of the U-shaped bracket.
Figure 9:
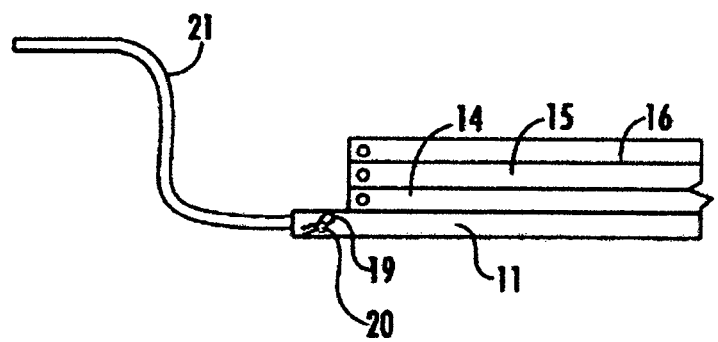
FIG. 9 is a side view showing the end portion of the ladder stand sections of FIG. 6 with a handle inserted into the end of the side rail of the lower section.
Figure 10:
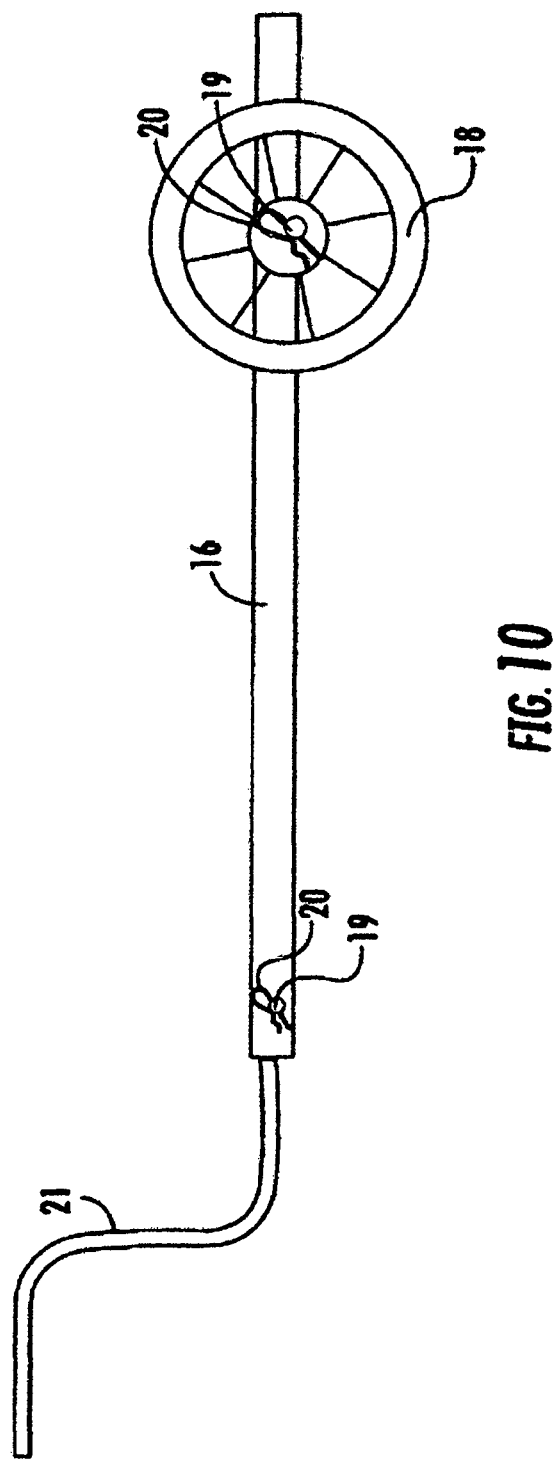
FIG. 10 is a side view showing a ladder stand section converted into a game cart using the kit of parts of FIGS. 3-5 and the handles of FIG. 7.

Referring now to FIG. 9, therein is shown a side view showing the end portion of the ladder stand sections of FIG. 6 with handle 21 inserted into the end of rail 11 of the lower section. A spare axel 19 and pin clip 20 can be used to retain handle 21 in rail 11. In use, handle 21 is used on both of the side rails of the lower section so that a hunter can more conveniently transport a bundle of ladder stand sections into or out of the woods. Referring now to FIG. 10, therein is shown a side view of a single ladder stand section converted into a game cart using the kit of parts of FIGS. 3-5 and the handles 21 of FIG. 9.

The components of the instant invention can be made of any suitable material. The axel retainer can be any known retainer. For example, the axel can have a threaded end so that the axel retainer is a nut, preferably a lock nut. The pin clip 20 shown in FIG. 5 is but one example of well known pin clips.

The kit of parts of the instant invention is more compact in storage than conventional ladder dollies or game carts. Another important benefit of the instant invention is that the kit of parts of the instant invention provides a means to convert a section of ladder for a ladder stand into a game cart.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A kit of parts comprising: a wheel, a bracket, an axel and an axel retainer, the axel having a central diameter, a larger first end and a second end portion adapted to receive an axel retainer, the bracket having a U-shape so that the bracket comprises a pair of spaced apart legs each of which legs comprise an axel aperture therein, the wheel having a hub comprising an axel bore there through, the axel bore having a diameter and a length, the central diameter of the axel being smaller than the axel aperture in each leg of the U-shaped bracket and smaller than the diameter of the axel bore of the hub of the wheel, the portion of the axle having a central diameter having a length greater than the sum of the distance between the spaced apart legs of the bracket plus the length of the bore through the hub of the wheel, the axel having a first end diameter larger than the axel aperture in each leg of the U-shaped bracket so that when the U-shaped bracket is slipped over the rail of a ladder stand section near one end of the ladder stand section so that the second end of the axel is insertable through the axel apertures of the U-shaped bracket so that the wheel slides onto the axel with the second end of the axel extending from the hub of the wheel so that the axel retainer can be attached to the second end portion of the axel to retain the wheel on the axel.

2. The kit of parts of claim 1 comprising two wheels, two axels, two axel retainers and two U-shaped brackets.

3. The kit of parts of claim 1, wherein the second end portion of the axel comprises a passageway there through, the axis of the passageway being transverse to the longitudinal axis of the axel, the axel retainer being a pin clip.

4. The kit of parts of claim 3, further comprising a pair of handles to be attached to the other end of the rails of the ladder stand section.

5. A method for transporting a ladder stand section or bundle of ladder stand sections using the kit of parts of claim 2 by slipped the U-shaped brackets over the rails of a ladder stand section so that the axels can be inserted through the axel apertures of the U-shaped brackets so that when each wheels is slid onto the axels with the second ends of the axels extending from the brackets so that each axel retainers is attached to each axel so that the ladder stand section or bundle of ladder stand sections can be transported on the wheels.

6. The method of claim 5 using the kit of parts of claim 3.

7. The method of claim 5 using the kit of parts of claim 4 so that the ladder stand section or bundle of ladder stand sections can be transported on the wheels by the handles.

* * * * *